(12) United States Patent
Zheng et al.

(10) Patent No.: US 8,615,543 B1
(45) Date of Patent: Dec. 24, 2013

(54) SATURATION AND ROUNDING IN MULTIPLY-ACCUMULATE BLOCKS

(75) Inventors: Leon Zheng, San Jose, CA (US); Martin Langhammer, Salisbury (GB); Steven Perry, High Wycombe (GB); Paul Metzgen, London (GB); Nitin Prasad, Milpitas, CA (US); William Hwang, Fremont, CA (US)

(73) Assignee: Altera Corporation, San Jose, CA (US)

(*) Notice: Subject to any disclaimer, the term of this patent is extended or adjusted under 35 U.S.C. 154(b) by 293 days.

(21) Appl. No.: 13/166,119

(22) Filed: Jun. 22, 2011

Related U.S. Application Data

(63) Continuation of application No. 12/324,055, filed on Nov. 26, 2008, now abandoned, which is a continuation of application No. 10/783,829, filed on Feb. 20, 2004, now Pat. No. 7,467,176.

(51) Int. Cl.
*G06F 7/38* (2006.01)

(52) U.S. Cl.
USPC .......................................................... 708/551

(58) Field of Classification Search
USPC ................................................. 708/550–553
See application file for complete search history.

(56) References Cited

U.S. PATENT DOCUMENTS

| | | | |
|---|---|---|---|
| 5,126,961 A * | 6/1992 | Garverick | 708/313 |
| 5,631,848 A | 5/1997 | Laczko et al. | |
| 5,847,978 A | 12/1998 | Ogura et al. | |
| 6,538,470 B1 | 3/2003 | Langhammer et al. | |
| 6,983,300 B2 | 1/2006 | Ferroussat | |
| 7,047,272 B2 | 5/2006 | Giacalone et al. | |
| 7,062,526 B1 | 6/2006 | Hoyle | |
| 2003/0141898 A1 | 7/2003 | Langhammer et al. | |
| 2004/0267857 A1 | 12/2004 | Abel et al. | |

* cited by examiner

*Primary Examiner* — Tan V. Mai
(74) *Attorney, Agent, or Firm* — Ropes & Gray LLP; Jeffrey H. Ingerman

(57) ABSTRACT

Saturation and rounding capabilities are implemented in MAC blocks to provide rounded and saturated outputs of multipliers and of add-subtract-accumulate circuitrs implemented using DSP. These features support any suitable format of value representation, including the x.15 format. Circuitry within the multipliers and the add-subtract-accumulate circuits implement the rounding and saturation features of the present invention.

12 Claims, 7 Drawing Sheets

SATURATION AND ROUNDING IN MULTIPLY-ACCUMULATE BLOCKS

CROSS-REFERENCE TO RELATED APPLICATIONS

This is a continuation of copending, commonly-assigned U.S. patent application Ser. No. 12/324,055, filed Nov. 26, 2008, which is a continuation of U.S. patent application Ser. No. 10/783,829, filed on Feb. 20, 2004, now U.S. Pat. No. 7,467,176, each of which is hereby incorporated by reference herein in its respective entirety.

BACKGROUND OF THE INVENTION

The present invention relates to programmable logic resources and more particularly, the present invention relates to programmable logic resources having digital signal processing (DSP) circuitry in which saturation and rounding is supported.

A programmable logic resource is a general-purpose integrated circuit that is programmable to perform any of a wide range of logic tasks. Known examples of programmable logic resource technology include programmable logic devices (PLDs), complex programmable logic devices (CPLDs), erasable programmable logic devices (EPLDs), electrically erasable programmable logic devices (EEPLDs), and field programmable gate arrays (FPGAs).

Manufacturers of programmable logic resources, such as Altera® Corporation of San Jose, Calif., have recently begun manufacturing programmable logic resources that, in addition to programmable logic circuitry, also include hardware DSP circuitry in the form of multiply-accumulate (MAC) blocks. The MAC blocks of programmable logic resources provide a way in which certain functionality of a user's design may be implemented using less space on the programmable logic resource, thus resulting in a faster execution time because of the nature of DSP circuitry relative to programmable logic circuitry. MAC blocks may be used in the processing of many different types of applications, including graphics applications, networking applications, communications applications, as well as many other types of applications.

MAC blocks are made of a number of multipliers, accumulators, and adders. The accumulators can perform add, subtract, or accumulate operations. Typically, there are four multipliers, two accumulators, and an adder in a MAC block. The MAC block can have a plurality of modes which may be selectable to provide different modes of operation.

MAC blocks are used to implement components of a user design that are appropriate for implementation in DSP that would otherwise require the use of a relatively large amount of programmable logic circuitry of the programmable logic resource. This allows the limited programmable logic circuitry of the programmable logic resource to be used for implementing more user design components than would otherwise be possible.

Typically, rounding and saturation circuitry for use with MAC blocks is implemented using the programmable logic circuitry of a programmable logic resource. This results in less programmable logic circuitry available for other components of a user design to be implemented within a particular programmable logic resource.

It would therefore be desirable to provide a programmable logic resource that makes more efficient use of its programmable logic circuitry and DSP circuitry.

SUMMARY OF THE INVENTION

It therefore an object of the present invention to provide a programmable logic resource that makes more efficient use of its programmable logic circuitry and DSP circuitry.

A MAC block is provided in which rounding and saturation capabilities are made available by using DSP resources within the MAC block. Rounding and saturation of multiplier outputs and of add-subtract-accumulate circuit (e.g., accumulator) outputs is provided by implementing within each of the respective components appropriate shifting circuitries, arithmetic circuitries, zeroing circuitries, truncation circuitries, data analysis circuitries, and/or any other suitable components in accordance with the present invention.

For example, in a multiplier were a 1.15 product output is desired, multiplication circuitry is used to generate an output that is left-shifted and added to a predetermined value in order arrange bits appropriately to allow the 16 MSB used to be obtained. The 16 MSB are preferably used for the 1.15 format rounded output.

Saturation is provided whereby the inputs to the multiplier are checked for overflow (i.e., when both inputs are $-1$ if in 1.15 format). If an overflow condition exists, then the saturation circuitry provides a predetermined saturated value as an output.

With respect to add-subtract-accumulate circuits, the present invention provides rounding capability within the respective components by providing appropriate circuitry for preparing a desired number of topmost bits of the output signal. For example, in an accumulator that normally outputs an 18.31 format value, a predetermined value may be added to coordinate the bits such that after zeroing (or truncating) the 16 LSB, an effective rounded 18.15 format output results.

Saturation is provided by circuitry that tests for the presence of an overflow or underflow condition (e.g., where the output of the add-subtract-accumulate circuit is greater than or equal to 1, or less than $-1$). If an overflow or underflow condition exists, then the saturation circuitry outputs an appropriate saturation value.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which.

DETAILED DESCRIPTION OF THE INVENTION

In accordance with the invention a multiplier-accumulator (MAC) block is provided in which multipliers and certain adders/substracte-rs (e.g., those used to implement accumulators) have rounding and saturating capabilities.

Figure 1:
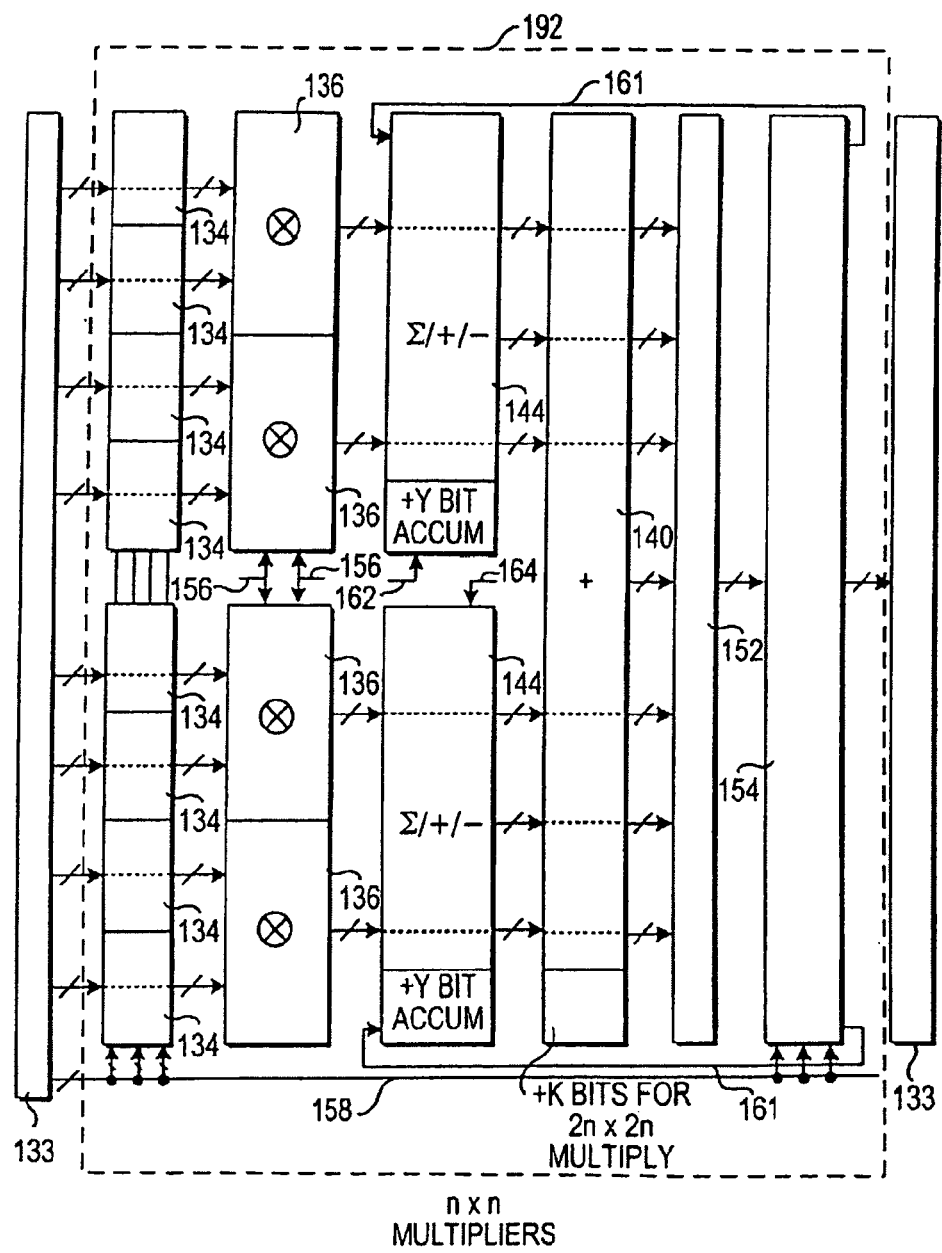
FIG. 1 is a block diagram of an illustrative MAC block in which four n bit by n bit multipliers are implemented as four n bit by is bit multipliers.

In FIG. 1, a vertically-arranged four multiplier-based organization of a MAC block is shown. Four multiplier circuits 136 may be stacked vertically to potentially operate in parallel. Each multiplier circuit 136 may include an n bits by n bits multiplier (e.g., 18 bit by 18 bit multiplier) to provide an n bits by n bits multiplication product. The inputs of each multiplier circuit may be fed up to n bits of information for the multiplicand and for the multiplier for the multiplier operation. Each multiplier circuit 136 may have an output that may be 2n-bits wide. Each multiplier circuit 136 may feed an output downstream that is the result of a multiplication operation. Each n bits by n bits multiplier circuit 136 may support two's complement signed or unsigned multiplication. Dynamic signed/unsigned control inputs 156 may receive input signals that control the sign of the multipliers and the multiplicands for the multiplier operations of multiplier circuits 136.

MAC block 192 may include three sets of register circuits. MAC block 192 may include input register circuits 134, pipeline register circuits, and output register circuit 154. If desired, additional pipeline register circuits may be included inside multiplier circuits 136, inside add-subtract-accumulate circuits 144, and/or inside add-subtract circuits 140 to increase speed. Output register circuit 154 may include approximately the same number of registers that are in input register circuits 134. The number of registers that are included in output register circuit 154 may be sufficient to register the output of MAC block 192 (e.g., register the output of MAC block 192 for all of the modes that, are supported by MAC block 192). The number of output registers may be less than, equal to, or greater than the number of the input registers depending on what implementation or architecture is being used for MAC block 192 or depending on the range of functionality that is being provided by MAC block 192.

For clarity and brevity, pipeline register circuits are not shown in FIG. 1 and are not shown in some of the other FIGS. described herein. As mentioned above, input register circuits 134, pipeline register circuit, or output register circuit 154 may be included in MAC block 192 if desired. Independent sets of clock and clear signals 158 may be provided for input register circuits 134, the pipeline register circuit, or output register circuit 154. Two sets of clock and clear signals 158 may be provided for the input register circuits 134 and the pipeline register circuits, and two sets may be provided for output register circuit 154. Input register circuits 134 may include scan chains and may include additional circuitry to be used with the scan chains to allow the scan chains to be used as logic in some digital signal processing functions such as in providing FIR filters. Input register circuits 134 may include 8n registers (e.g., 144 registers) for 8n data inputs and q registers (e.g., 4 registers) for signed/unsigned control of multiplier circuits 136 and for add-subtract control of add-subtract-accumulate circuits 144. Each register may have programmable inversion capability to provide logic inversion, when desired, or to invert unused bits of register inputs when an input for a multiplier has less than n bits.

Output register circuit 154 may have feedback paths 161 to add-subtract-accumulate circuits 144 for accumulation operations. Any one of the three sets of registers, input register circuit 134, the pipeline register circuit, and output register circuit 154 may be bypassed using programmable logic connectors ("PLCs") in those circuits that may be controlled by random access memory control. The pipeline register circuit may include approximately the same number of registers as input register circuits 134.

Interface circuitry 133 shown to the left of MAC block 192 may feed the inputs of MAC block 192, which may be the inputs of input register circuits 134. Input register circuits 134 may include eight input registers that each have n bit inputs and that feed the inputs of the four n bit by n bits multiplier circuits 136.

Add-subtract-accumulate circuits 144 may have connections for receiving inputs from multiplier circuits 136 and from return paths 161. If desired, add-subtract-accumulate circuits 144 may be configured to pass the outputs from multiplier circuits 136 to adder circuit 140. The outputs of multiplier circuits 136 may be routed to output selection circuit 152 or output register circuit 154 without being routed through add-subtract-accumulate circuits 144 and/or add-subtract circuit 140. For the purposes of clarity and brevity and not by way of limitation and without loss of generality, add-subtract circuit 140 is described herein primarily in the context of an adder circuit. Add-subtract-accumulate circuits 144 may each be configured to perform a two's complement addition of two 2n bit inputs to produce a 2n+1 bit output. Add-subtract-accumulate circuits 144 may each be configured to perform a two's complement subtraction of two 2n bit inputs to produce a 2n+1 bit output. Add-subtract-accumulate circuits 144 may each be configured to perform an accumulation of one 2n bit input with an n+y bit output. Dynamic add/subtract control inputs 162 and 164 may be inputs to add-subtract-circuits 144 that are used to switch between addition and subtraction operations and to handle complex multiplications. Dynamic add/subtract inputs 162 and 164 may be needed for complex multiplications, which involves multiplications involving complex numbers. Complex multiplication of two complex numbers may sometimes involve both an addition operation and a subtraction operation.

The outputs of add-subtract-accumulate circuits 144 may be routed to output selection circuit 152 or output register 154 without being routed through adder circuit 140. If desired, adder circuit 140 may be configured to pass inputs from add-circuits 144 (e.g., n+1 bit output of two's complement addition, n+y bit output of accumulation, etc.). Adder circuit 140 may have an output that is the resultant of the addition of the outputs from add-subtract-accumulate circuits 144. Output selection circuit 152 may have inputs that are from adder circuit 140. Output selection circuit 152 may select which ones of the inputs of output selection circuits 152 are passed to output register circuit 154. Output register circuit 154 may feed the inputs of interface circuitry 133 shown to the right of MAC block 192. The percent of local interconnect resources that is allocated for connecting the circuits in MAC block 192 increases as the complexity and the variations in digital signal processing functionality increases from left to right in MAC block 192.

With reference to FIG. 1, the "top half" of MAC block 192 may include, among other components, the two multipliers 136 and add-subtract-accumulate circuit 144 shown at the top of MAC block 192. The "bottom half" of MAC block 192 may include, among other components, the two multipliers 136 and add-subtract-accumulate circuit showing at the bottom of MAC block 192.

MAC block 192 may be configured to have an n/2 bits by n/2 bits multiplier based organization. For example, with reference now to FIG. 2, MAC block 192 may include multiplier circuits 136 that are configured to include eight n/2 bits by n/2 bits multipliers. The eight n/2 bits by n/2 bits multipliers may be configured from the four n bits by n bits multipliers of multiplier circuits 136 of FIG. 1.

If desired, MAC block 192 may be implemented to be able to be configured to have a p bits by p bits multiplier based organization and to have one or more p/m bits by p/m bits multiplier based organizations where p, m, and p/m are integers. As mentioned above, this architecture is at least partially based on the limitations of the local interconnect resources. The different organizations may be selectable and MAC block 192 may be capable of being configured into some or all of the p/m bits by p/m bits multiplier based organizations.

MAC block 192 may include add-subtract-accumulate circuits 144 configured to provide four add or subtract units. Each add or subtract unit may perform an addition-based operation on two n bit inputs and have an n+1 bit output. If desired, add-subtract-accumulate circuits 144 may be configured to pass the outputs of the n/2 bits by n/2 bits multiplier operation. The outputs of multiplier circuits 136 may be routed to output selection circuit 152 or output register circuit 154 without being routed through add-subtract-accumulate circuits 144 or adder circuit 140. Add-subtract-accumulate circuits 144 may produce the resultant of the addition (or subtraction) of particular output pairs of the n/2 bits by n/2 bits multiplier operation.

MAC block 192 may include adder circuit 140 configured to provide two adders. If desired, adder circuit 140 may pass the inputs that are fed to adder circuit 140 from add-subtract-accumulate circuits 144. The outputs of add-subtract-accumulate circuits 144 may be routed to output selection circuit 152 or output register circuits 154 without being routed through adder circuit 140. Adder circuit 140 may produce two outputs that are the resultants of the addition of particular pairs of outputs from add-subtract-accumulate circuits 144.

The local interconnect resources of MAC block 192 may be configurable to implement the n/2 bits by n/2 bits multiplier based organization with the same input/output interface circuitry 133 and supporting circuitry (e.g., multiplier circuits 136, adder circuit 140, etc.) as the n bits by n bits multiplier based organization. The local interconnect resources of MAC block 192 may be configured to include some butterfly cross connection patterns for forming appropriate interconnections in the n/2 bits by n/2 bits multiplier based organization.

The butterfly cross connection patterns are implemented for select interconnections between input register circuits 134 and multiplier circuits 136. The butterfly cross connection patterns may be used to have the n/2 higher order bits of pairs of n bit inputs multiplied together and to have the n/2 lower order bits of pairs of n inputs multiplied together. The butterfly cross connection patterns are implemented for select interconnections between multiplier circuits 136 and add-subtract-accumulate circuits 144. As mentioned above, add-subtract-accumulate circuits 144 may be configured to include four add (or subtract) units. Each add (or subtract) unit may have two n bit inputs from multiplier circuits 136. The butterfly cross connection patterns may be used to have the two inputs of each add (or subtract) unit be either the resultant of the multiplication of the higher order bits by the multipliers of multiplier circuits 136 or the resultant of the multiplication of the lower order bits by the multipliers of multiplier circuits 136. The butterfly cross connection patterns may also be used in the interconnect between add-subtract-accumulate circuits 144 and adder circuit 140. Adder circuit 140 may be split into two adders (e.g., two independent adders). The butterfly cross connection pattern may be used to feed the resultant of operations on higher order bits to a top half of adder circuit 140 and to feed the resultant of operations on lower order bits to a bottom half of adder circuit 140. In the n/2 bits by n/2 bits multiplier based organization, accumulator functionality may not be available. Accumulator functionality may not be available because the resources of MAC block 192 may be substantially consumed in allowing for the implementation of the n/2 bits by n/2 bits multiplier based organization.

The butterfly cross connection patterns are exemplary of techniques for decomposing a single multiplier circuit into multiple smaller multiplier circuits, exemplary of techniques for managing data so that the outputs of the multiple smaller multiplier circuits are appropriately added together (e.g., adding lower order bits to lower order bits), or exemplary of techniques for managing data to compensate for limitations in the resources of a MAC block. Such cross connect patterns may be used to handle connections because of the way that circuitry for a MAC block was laid down or because of the arrangement that was selected for the circuitry. The butterfly cross connection patterns are provided as an illustrative example. Other techniques may also be used. For example, the n bits by n bits multipliers may be decomposed in a different way that eliminates the need for the butterfly cross connection patterns or decomposed in a way that may require different types of cross connect patterns. Accordingly, other cross connection or connection patterns may be used to implement MAC block 192.

The flexibility and configurability of MAC block 192 may support the configuration of a set of modes of operation. If desired, MAC block 192 of FIG. 1 and MAC block 192 of FIG. 2 may each be a separate embodiment of a MAC block with each having its own set of modes of operation. In some embodiments, MAC block 192 may be configurable between having an n bits by n bits multiplier based organization or an n/2 bits by n/2 bits multiplier based organization and having modes of operation that are associated with each. The modes of MAC block 192 may be configured with memory bits to make the modes available to users.

Figure 2:
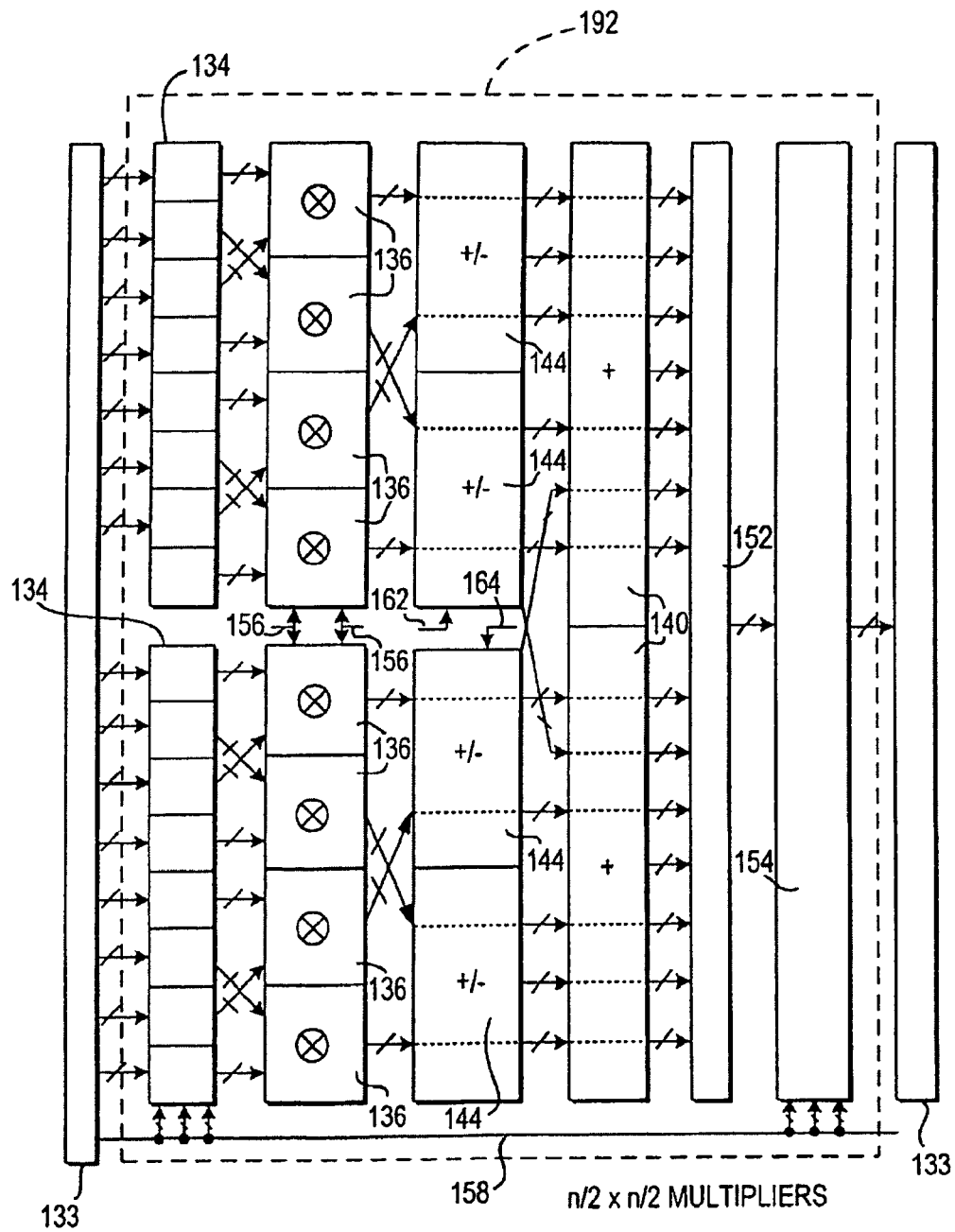
FIG. 2 is a block diagram of an illustrative MAC block in which four n bit by n bit multipliers are implemented as eight n/2 bit by n/2 bit multipliers.

The present invention is primarily described herein in terms of a MAC block having four 18 bit by 18 bit multipliers with two add-subtract-accumulate circuits and one second stage adder arranged as illustrated in FIGS. 1 and 2. It will be understood that this is merely an illustrative arrangement and that the present invention may be practiced with any other suitable MAC block have any suitable types of components arranged in any suitable arrangement.

A MAC block can be selected to operate in any suitable mode of operation. For example, for a MAC block having four 18 bit by 18 bit multipliers, where each multiplier can generate a 36 bit output that is the product of two 18 bit multiplicand inputs or two products (concatenated into a 36 bit product) of two pairs of 9 bit multiplicand inputs (concatenated into one pair of 18 bit inputs), suitable modes of operation include, for example, an 18 bit by 18 bit multiplier, a 52 bit accumulator (e.g., multiply-and-accumulate), a sum of two 18 bit by 18 bit multipliers, a sum of four 18 bit by 18 bit multipliers, a 9 bit by 9 bit multiplier, a sum of two 9 bit by 9 bit multipliers, a sum of four 9 bit by 9 bit multipliers, a 36 bit by 36 bit multiplier, or other suitable modes. It will be understood that these are merely illustrative modes that may be supported by a MAC block in accordance with the present invention. Other suitable modes may by supported. Those modes listed above will be referred to herein as modes 1-8, respectively. Such support of modes may be determined based on any suitable factors, including, for example, application needs, size of available multipliers, number of multipliers, or other suitable factors. For example, it is clear that if a MAC block included eight 9 bit by 9 bit multipliers, different modes may be used (e.g., sum of eight 9 bit by 9 bit multipliers).

One common DSP number representation is the 1.15 format. The 1.15 format is a fixed-point number representation in which 16 bits are used to represent values from −1 to (1—the least significant bit ("LSB")). The most significant bit (MSE) represents the sign bit and the rest of the bits represent the fractional component. A MAC block implemented in accordance with the present invention supports rounding and saturation of 1.15 format numbers within any or all of its respective multipliers as well as within any or all of its respective add-subtract-accumulate circuits (sometimes referred to herein as an "accumulator").

It will be understood that the rounding and saturation features of the present invention may be implemented in multipliers and in add-subtract-accumulate circuits when those components are used to implement any suitable mode of operation. For example, rounding and saturation may be provided in add-subtract-accumulate circuits in an accumulate mode, or in any other suitable mode, such as a sum of two 18 bit by 18 bit multiplier mode. If desired, rounding and saturation may also be provided in other arithmetic circuitry, such as in second stage adder 140 (FIGS. 1 and 2).

Rounding and saturation in multipliers and in add-subtract-accumulate circuits (i.e., according to the present invention) may be supported among any or all modes of operation of a MAC block. For example, in one suitable arrangement, rounding and saturation in the multipliers may be supported in modes 1 to 4; rounding in the add-subtract-accumulate circuit may be supported in modes 2 to 4; saturation in the add-subtract-accumulate circuit may be supported in mode These restriction are illustrative restrictions that may result as a consequence from a particular implementation of a MAC block and of the present invention. It will be understood that any suitable implementations may be used and that as a result any suitable restrictions may ensue. Restrictions may also be made by, for example, a user design or by the manufacturer of the programmable logic device for any suitable reasons. It will also be understood that saturation may be provided for a particular multiplier or add-subtract-accumulate circuit but not rounding. Rounding may be provided for a particular multiplier or add-subtract-accumulate circuit but not saturation. Any such suitable design may be implemented.

It will be understood that multiplication of two 1.15 format numbers produces a 2.30 product. Because the two 1.15 format numbers are in the range of −1 to 1, only one sign bit need preferably be used. The multiplication product is therefore preferably left shifted by 1 bit resulting in a 1.31 number in which the LSB of the shifted product is zero. In one suitable approach, there need not be an actual left shift in the hardware implementation of the left shift. Rather, instead of taking the 1.31 product on the 32 MSB of the multiplier output bus, the 1.31 product is located on bits [34:3] of the output bus. This is merely an illustrative optimization that need not be implemented (i.e., an actual left shift may be implemented). Also, any suitable bits of the output bus may be used besides [34:3].

In many DSP applications, a rounded 1.15 format 16 bit product is desired. Thus, users are interested in the top 16 bits (i.e., the 16 MSE) of the shifted product. One way in which this desired result may be obtained is by adding the value 0x00008000 to the shifted product so that the 16 LSB of the shifted product may then be set to zero, resulting in an unbiased rounded 1.15 format result.

In one suitable approach, instead of zeroing the 16 LSB of the multiplication product, a truncation may be performed whereby the 16 LSB are truncated to generate a rounded and truncated 1.15 result. A separate truncate signal may be used whereby round signal 302 and the truncate signal may be ORed together in order to control the operation of zeroing circuitry 328. Alternatively, truncation may be the only method of rounding provided. For purposes of clarity and brevity, the present invention is primarily described herein in terms of zeroing the 16 LSB. It will be understood that truncating may be implemented in place of or in addition to the zeroing approach.

A special case in 1.15 format multiplication occurs when multiplying 0x8000 (i.e., −1) by 0x8000 (i.e., −1). It will be understood that the result (i.e., 1) cannot be represented in the 1.31 format. Instead, the 1.31 format multiplier product is preferably set to 0x7FFFFFFF (i.e., 1-LSE) if saturation is enabled. If not enabled, then circuitry responsible for rounding and for saturating is preferably bypassed.

Enabling saturation generates an overflow bit. The overflow bit may be located at any suitable bit location in the product (in the case of saturation in a multiplier) or sum (in the case of saturation in an add-subtract-accumulate circuit). For example, the overflow bit may be located on the LSB of the product. The overflow bit may be located at a different bit location depending on any suitable factor, such as current mode of operation.

With regard to rounding and saturation in the add-subtract-accumulate circuit, if the multiplication product is located in bits [34:3] of the multiplier output bus, a 52 bit accumulator would have 49 bits of precision. This provides up to 131072 (i.e., 2E17) accumulation cycles as opposed to 1048576 (i.e., 2E20) provided by product located in bits [31:0]. It will be appreciated, however, that outputs may be located on any suitable bits even if fewer accumulation cycles are provided. Such design decisions may be based on any suitable design and application criteria.

When rounding is activated, 0x000008000 is added to the accumulator and the 16 LSE of the accumulator result are set to zero.

When saturation is activated, the accumulator value is set to either the maximum (0x000007FFFFFFF) in case of overflow or the minimum (0x1FFFF80000000) in case of underflow. The accumulator's overflow bit may be located on any suitable bit of the output bus (e.g., LSB, bit [2], etc.). The 49 accumulator bits may be located on the accumulator output bus's bits [51:3].

Figure 3:
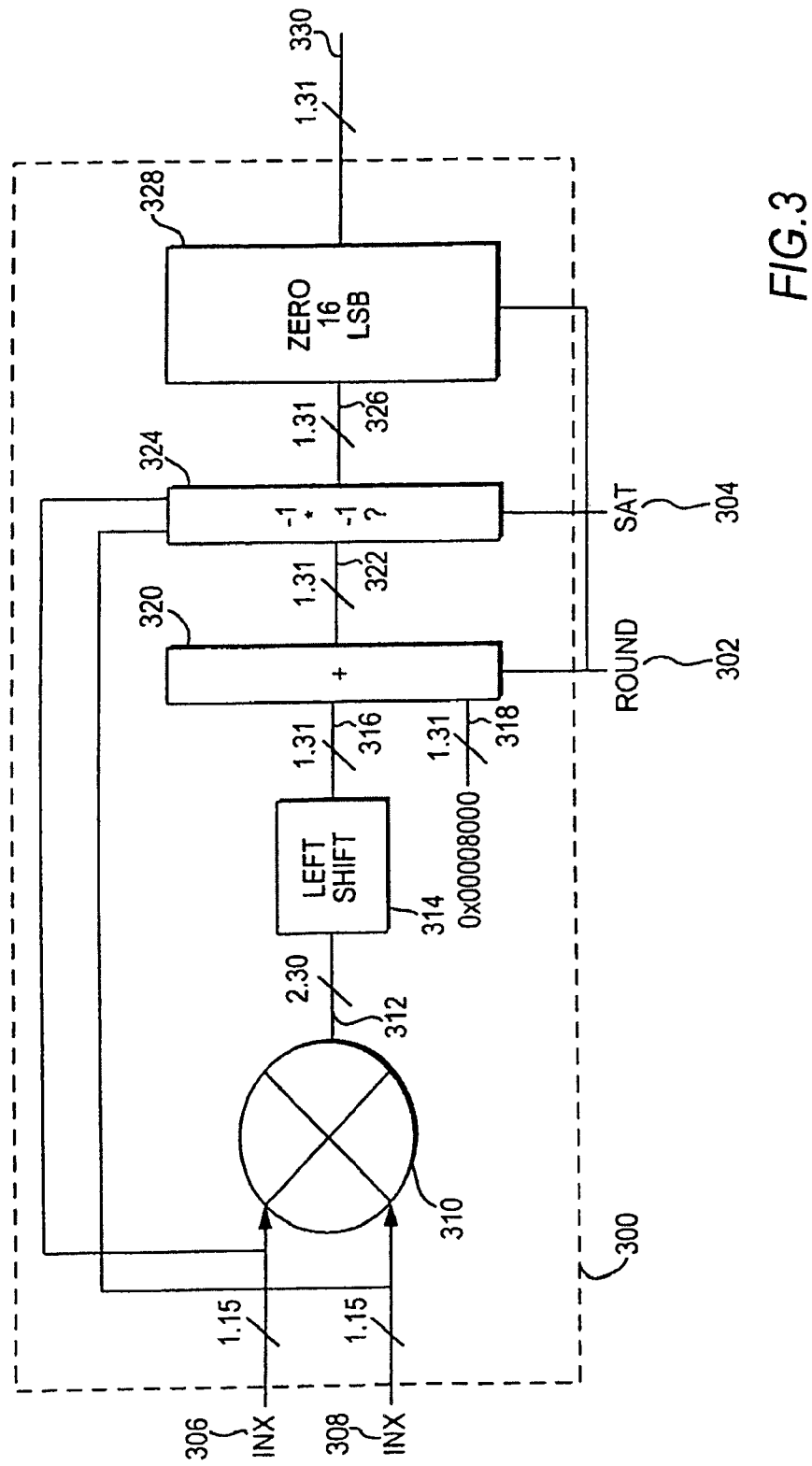
FIG. 3-5 are schematic diagrams of an illustrative multiplier having rounding and saturation capabilities in accordance with the present invention.

The present invention will now be described with reference to FIGS. 3-6. FIG. 3 shows an illustrative multiplier 300 implemented in accordance with one embodiment of the present invention. Inputs 306 and 308 are multiplied using multiplication circuitry 310. Output 312 of multiplication circuitry is in a 2.30 format. Output 312 is left-shifted using shifting circuitry 314 to produce output 316 having a 1.31 format (i.e., because only a single sign bit is needed).

If round signal 302 indicates that rounding is to be activated, then 1.31 format signal 316 is added with 0x00008000 (i.e., via input 318) using adder 320. This is done in order to add 1 to the 16$^{th}$ MSB of the fractional part of the 1.31 format product (i.e., signal 316) when the product is represented over bits [31:0]. Output 322 of adder 320 is in a 1.31 format. If saturation signal 304 indicates that an overflow condition is to be checked and dealt with, then saturation circuitry 324 checks whether inputs 306 and 308 are 0x8000 (−1) and 0x8000 (−1). If so, saturation takes place in which output 326 is set to 0x7FFFFFFF (i.e., 1-LSE). This avoids having to make the impossible representation of the value 1 using 1.15 (or 1.31) format.

Output 326 (i.e., in 1.31 format) of saturation circuitry 324 is then input into zeroing circuitry 328. If round signal 302 indicates that rounding is to take place, then at circuitry 328, rounding takes place by zeroing the 16 LSB of the 1.31 format value represented by signal 326. Output 330 of zeroing circuitry then provides a 1.31 signal in which the LSB 16 bits are zero, effectively representing a 1.15 format.

Figure 4:
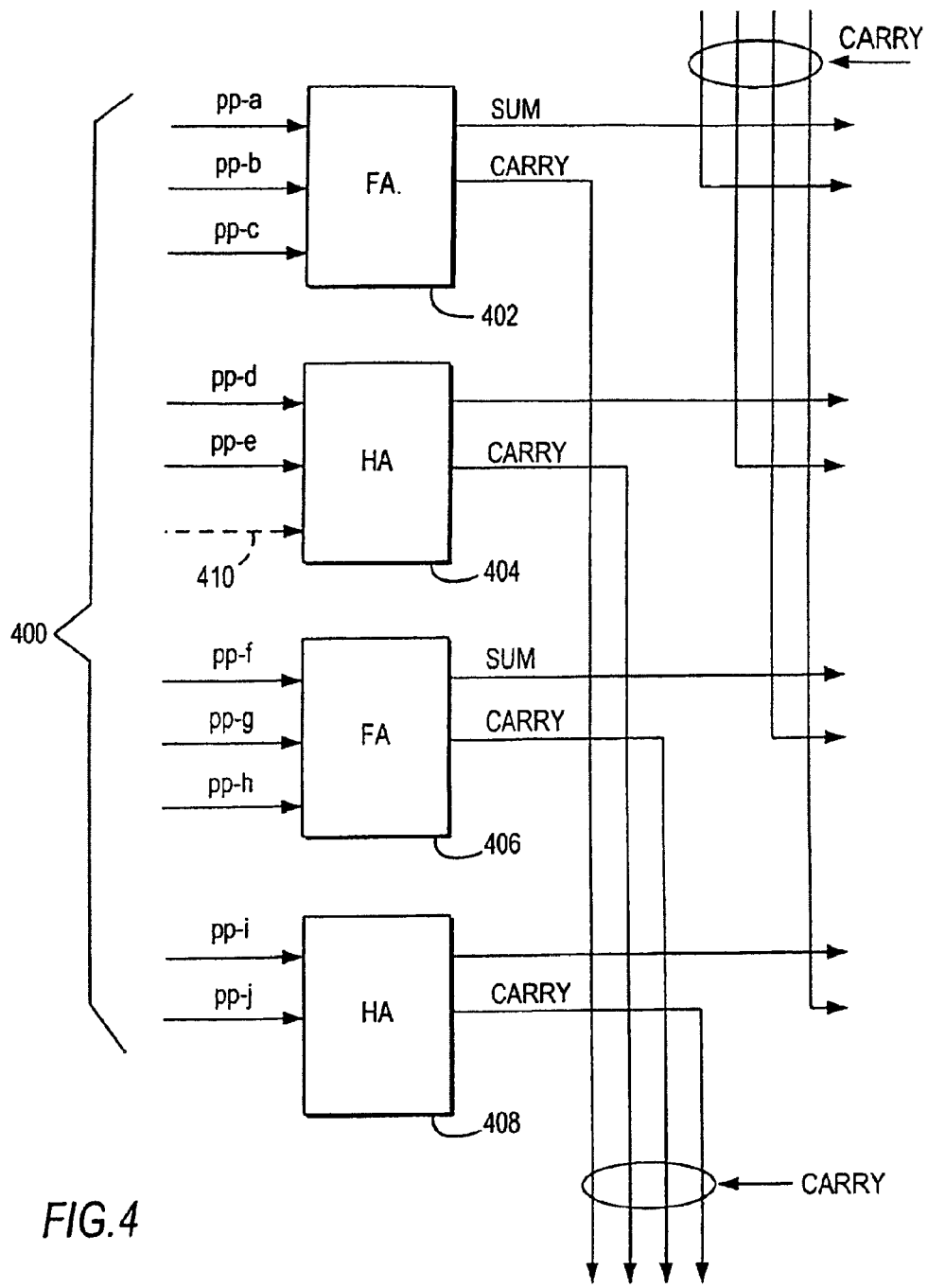

FIG. 4 is an illustrative block diagram of a portion of adder 320 in accordance with the present invention when rounding is not activated. FIG. 4 shows 10 partial product terms 400 (i.e., because of the preferable ability to split the 18 bit by 18 bit multiplier of which this circuitry is part into two 9 bit by 9 bit multipliers). Partial product terms 400 are preferably input into full adders 402 and 406 and half adders 404 and 408.

Input 410 is an effectively non-existent round input. That is, because FIG. 4 illustrates circuitry of adder 320 when there is no rounding, adder 404 does not receive any round-based input, making adder 404 an effective half adder.

Figure 5:
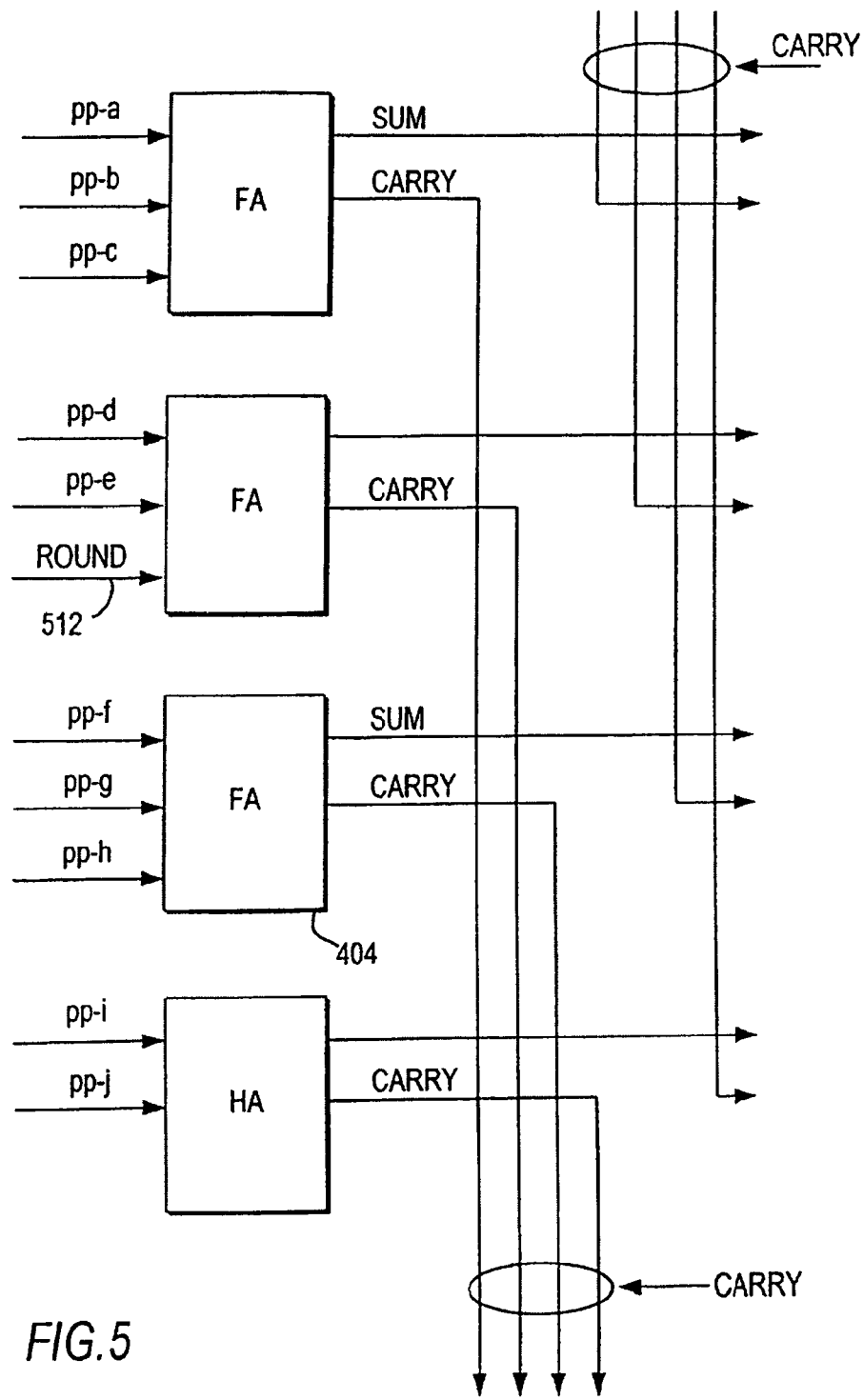

When rounding is activated, then, as illustrated in FIG. 5, adder 404 becomes an effective full adder because input 512 represents signal 318 (i.e., 0x00008000).

Figure 6:
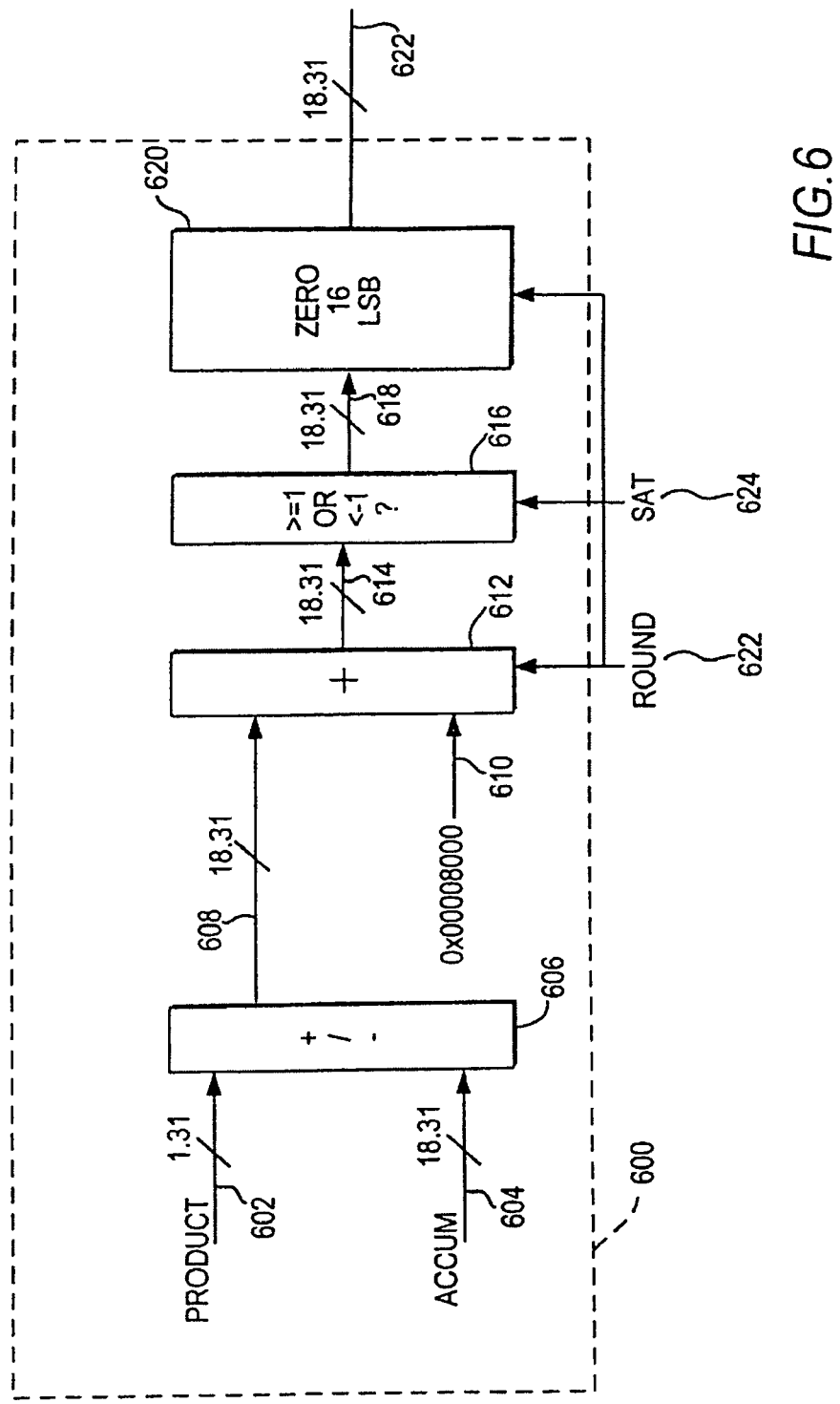
FIG. 6 is a schematic diagram of an illustrative add-subtract-accumulate circuit in accordance with the present invention.

FIG. 6 shows a block diagram of an illustrative accumulator having rounding and saturation capabilities in accordance with the present invention. Adder/subtracter 606 takes as input signals 602 and 604 corresponding to a product from a multiplier and an accumulator value derived from a previous accumulation cycle, respectively. Signal 602 is preferably a 1.31 format representation. Signal 604 is preferably a 18.31 format representation (i.e., because the multiplication product is preferably located in bits [34:3] of the multiplier output bus, the accumulator has 49 bits of precision.

When rounding is activated (i.e., as indicated by round signal 622), 0x00008000 is added to the accumulator (i.e., because most applications are interested in the 16 MSB). This is shown in FIG. 6 by adder 612 adding together signal 608, representing the unrounded, unsaturated accumulator result with signal 610, representing 0x00008000. The 16 LSE are then set to zero using zeroing circuitry 620.

Unlike saturation in multipliers where because of the nature of the 1.15 format, the only result that produces difficulty is −1, with accumulation, it will be appreciated that overflow and underflow conditions may exist when the accumulation result is greater than or equal to 1 or less than −1.

If saturation is enabled (i.e., based on saturation signal 624), then saturation circuitry 616 tests for overflow and underflow conditions (i.e., where the accumulator result is greater than or equal to 1, or less than −1, respectively). If an overflow or underflow is encountered, then saturation circuitry 616 sets output 618 to the maximum (i.e., 0x000007FFFFFFF) or minimum (i.e., 0x1FFFF80000000), respectively. It will be understood that the overflow and underflow conditions tested by saturation signal 624 is different from the overflow output bit in the accumulator. If no underflow or overflow is found, then signal 618 is carrying substantially the same value as signal 614.

If rounding is enabled, then zeroing circuitry 620 zeros the 16 LSE of the value represented by input signal 618 to produce a 18.31 format output 622 in which the 16 LSB are zero. Thus, the output is effectively, in a 18.15 format.

As was discussed above, user are many times interested in the 16 MSB of an output. This is with respect to the fractional component of a x.15 format representation of a value. The variable "x" may be any suitable integer that represents the number of bits representing a whole number value, which, when added to the fractional component, produces the value represented by x.15.

It will be understood that although the present invention is described herein predominately in terms of a 1.15 format inputs and outputs, 1.31 format intermediate values, 18.31 format values, 18.15 format values, etc., the present invention may be applied using any other suitable representation of values. For example, the predetermined values (e.g., corresponding to signals 610 and 318) used may be adjusted based on which format is being used; zeroing circuitries 622 and 328 may be adjusted to produced any suitable format output; and any other suitable modifications may be made to accommodate any desired representation of values in accordance with the present invention.

It will be appreciated that each multiplier of a MAC block and that each add-subtract-accumulate circuit of a MAC block may be implemented with the rounding and saturation capabilities described above. For example, separate signals 622 and 624 may be used for each distinct multiplier and add-subtract-accumulate circuit. Alternatively, only some of these components may be implemented having rounding and saturation capabilities.

Figure 7:
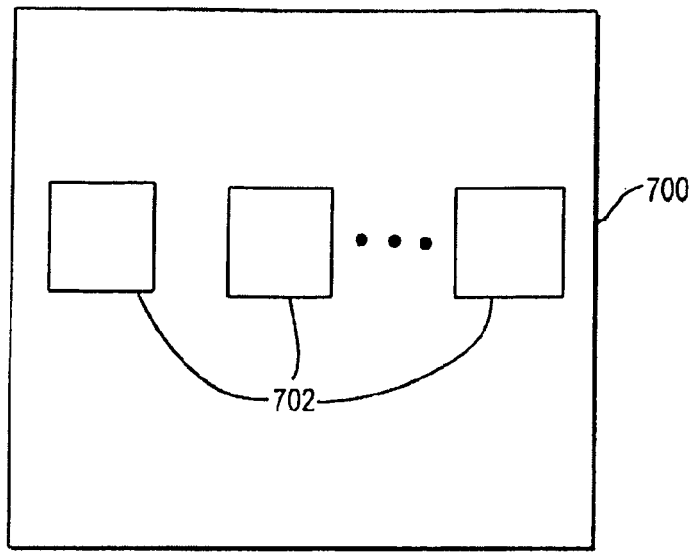
FIG. 7 is a block diagram of an illustrative programmable logic resource having at least one MAC block in accordance with the present invention.

FIG. 7 is a simplified block diagram of a programmable logic resource 700 having one or more MAC blocks 702 configured in accordance with the present invention. Programmable logic resource 700 may have any suitable interconnection circuitry, memory circuitry, and programmable logic circuitry to allow programmable logic resource 700 to implement user designs and to make use of MAC blocks 702 in implementing the user designs.

Figure 8:
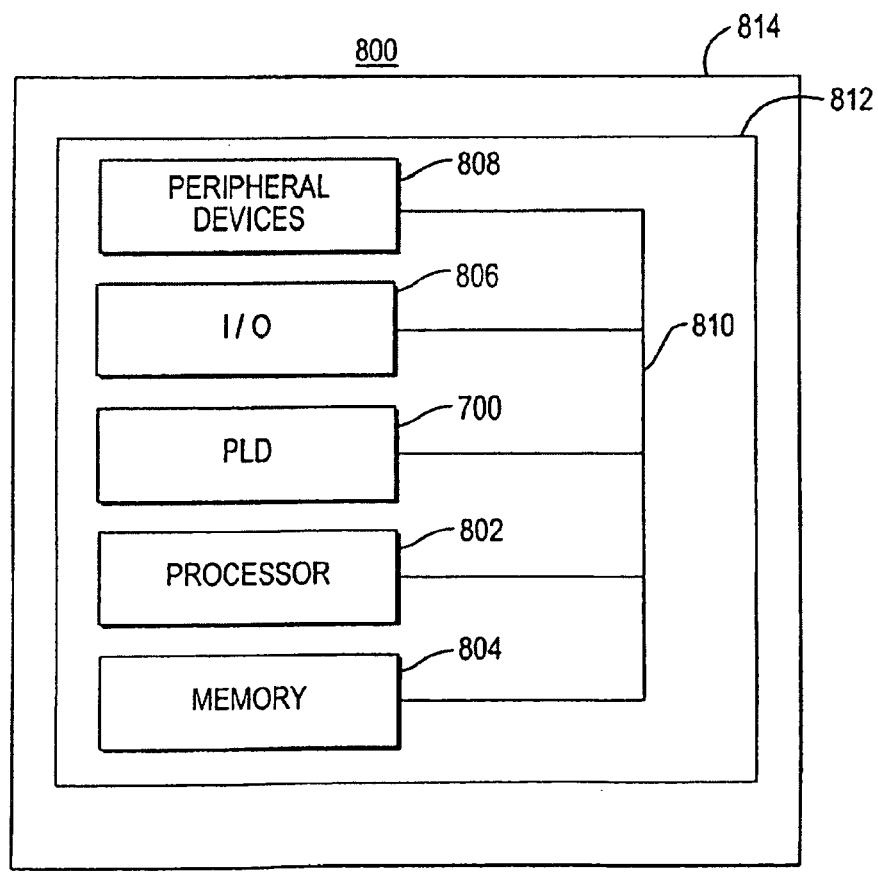
FIG. 8 is a block diagram of an illustrative system employing a programmable logic resource in accordance with the present invention.

FIG. 8 illustrates a programmable logic resource 700 (FIG. 7) of this invention (i.e., having at least one multiplier configured with the mode splitting features of the present invention) in a data processing system 800 in accordance with one embodiment of the present invention. Data processing system 800 may include one or more of the following components: a processor 802; memory 804; I/O circuitry 806; and peripheral devices 808. These components are coupled together by a system bus 810 and are populated on a circuit board 812 which is contained in an end-user system 814.

System 800 may be used in a wide variety of applications, such as computer networking, data networking, instrumentation, video processing, DSP, or any other application where the advantage of using programmable or reprogrammable logic is desirable. Programmable logic resource 700 may be used to perform a variety of different logic functions. For example, PLD 800 may be configured as a processor or controller that works in cooperation with processor 802. Programmable logic resource 700 may also be used as an arbiter for arbitrating access to a shared resource in system 800. In yet another example, programmable logic resource 700 may be configured as an interface between processor 802 and one of the other components in system 800.

Thus, saturation and rounding in a MAC block is provided. One skilled in the art will appreciate that the present invention can be practiced by other than the described embodiments, which are presented for purposes of illustration and not of limitation, and the present invention is limited only by the claims which follow.

What is claimed is:

1. A programmable logic resource comprising:
at least one add-subtract-accumulate circuit implemented using digital signal processing circuitry, the at least one add-subtract-accumulate circuit comprising:
addition/subtraction circuitry that adds/subtracts inputs to the add-subtract-accumulate circuit,
adder circuitry coupled to the addition/subtraction circuitry that adds an output of the addition/subtraction circuitry to a predefined value, and
zeroing circuitry coupled to the adder circuitry that zeros a predetermined number of least significant bits of an output of the adder circuitry.

2. The programmable logic resource of claim 1 wherein the digital processing circuitry is a multiply-accumulate block.

3. The programmable logic resource of claim 1 further comprising saturation circuitry coupled to the output of the adder circuitry and to the zeroing circuitry, wherein the saturation circuitry is configured to determine whether the output of the adder circuitry is in an overflow or underflow condition.

4. The programmable logic resource of claim 3 wherein if the output of the adder circuitry is in an overflow or underflow condition, the saturation circuitry outputs to the input of the zeroing circuitry a saturated value.

5. The programmable logic resource of claim 1 wherein one of the inputs to the addition/subtraction circuitry is in a 1.31 format and another of the inputs to the addition/subtraction circuitry is in an 18.31 format.

6. The programmable logic resource of claim 5 wherein the predetermined value is in a 1.31 format.

7. The programmable logic resource of claim 5 wherein the predetermined value is 0x00008000.

8. The programmable logic resource of claim 1 wherein the predetermined number of least significant bits is 16.

9. A printed circuit board on which is mounted a programmable logic resource as defined in claim 1.

10. The printed circuit board defined in claim 9 further comprising:
a memory mounted on the printed circuit board and coupled to the memory circuitry.

11. The printed circuit board defined in claim 10 further comprising:
processing circuitry mounted on the printed circuit board and coupled to the memory circuitry.

12. The programmable logic resource of claim 1 wherein the zeroing circuitry is coupled downstream of the adder circuitry.

* * * * *